United States Patent [19]

Castle

[11] 4,106,338

[45] Aug. 15, 1978

[54] WATER DETECTOR MEANS FOR TANK LIQUID LEVEL MEASURING SYSTEM

[75] Inventor: John H. Castle, Tulsa, Okla.

[73] Assignee: Control Marketing Associates, Tulsa, Okla.

[21] Appl. No.: 844,517

[22] Filed: Oct. 21, 1977

[51] Int. Cl.² .............................................. G01F 23/16
[52] U.S. Cl. ......................................... 73/302; 73/307
[58] Field of Search ................... 73/302, 306, 307, 308

[56] References Cited

U.S. PATENT DOCUMENTS

| 2,559,436 | 7/1951 | Isserstedt | 73/302 |
| 3,572,121 | 3/1971 | Kesserv | 73/302 |

FOREIGN PATENT DOCUMENTS 327,916   4/1930   United Kingdom ...................... 73/302

Primary Examiner—S. Clement Swisher
Attorney, Agent, or Firm—D. Paul Weaver

[57] ABSTRACT

A float valve on the bottom of a submerged purging tube in a liquid storage tank detects water in the bottom of the tank below a liquid therein of a lesser specific gravity. When such water or other heavier liquid is detected by the float valve, the purging orifice leading to the purging tube is closed and further pressurizing of the purging tube will result in an associated gage registering the presence of water in the tank.

7 Claims, 3 Drawing Figures

U.S. Patent    Aug. 15, 1978    4,106,338
FIG.1
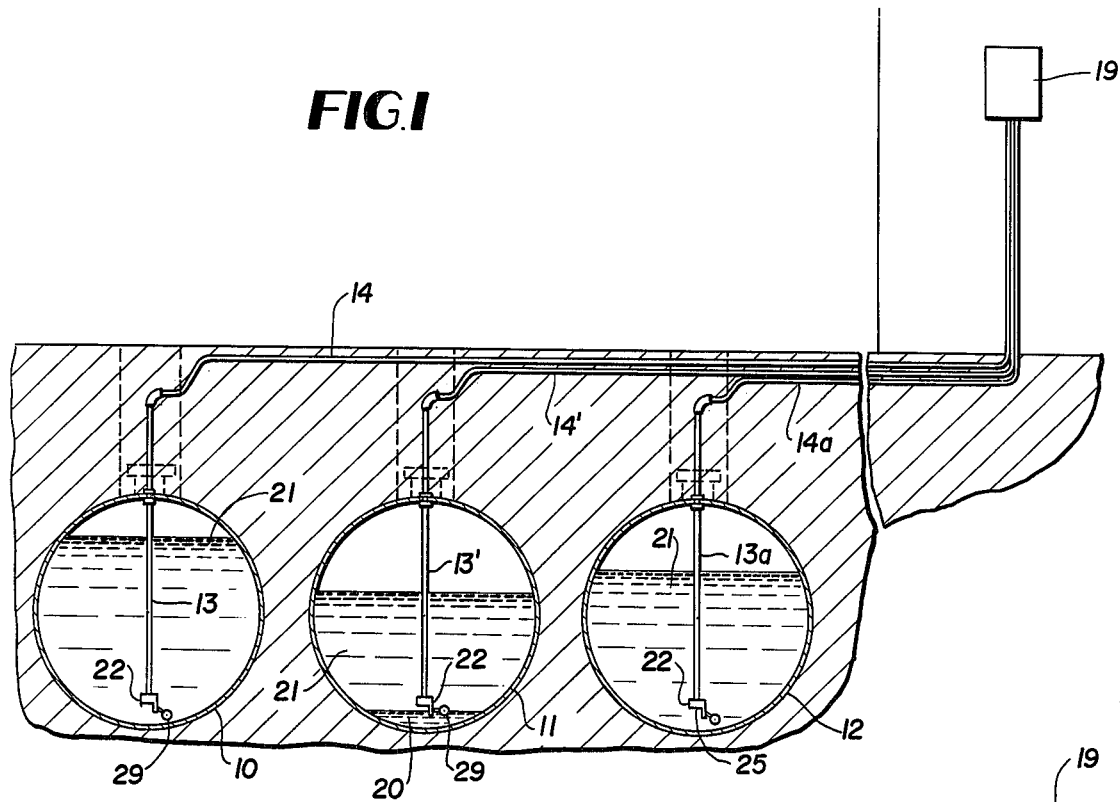
FIG.2
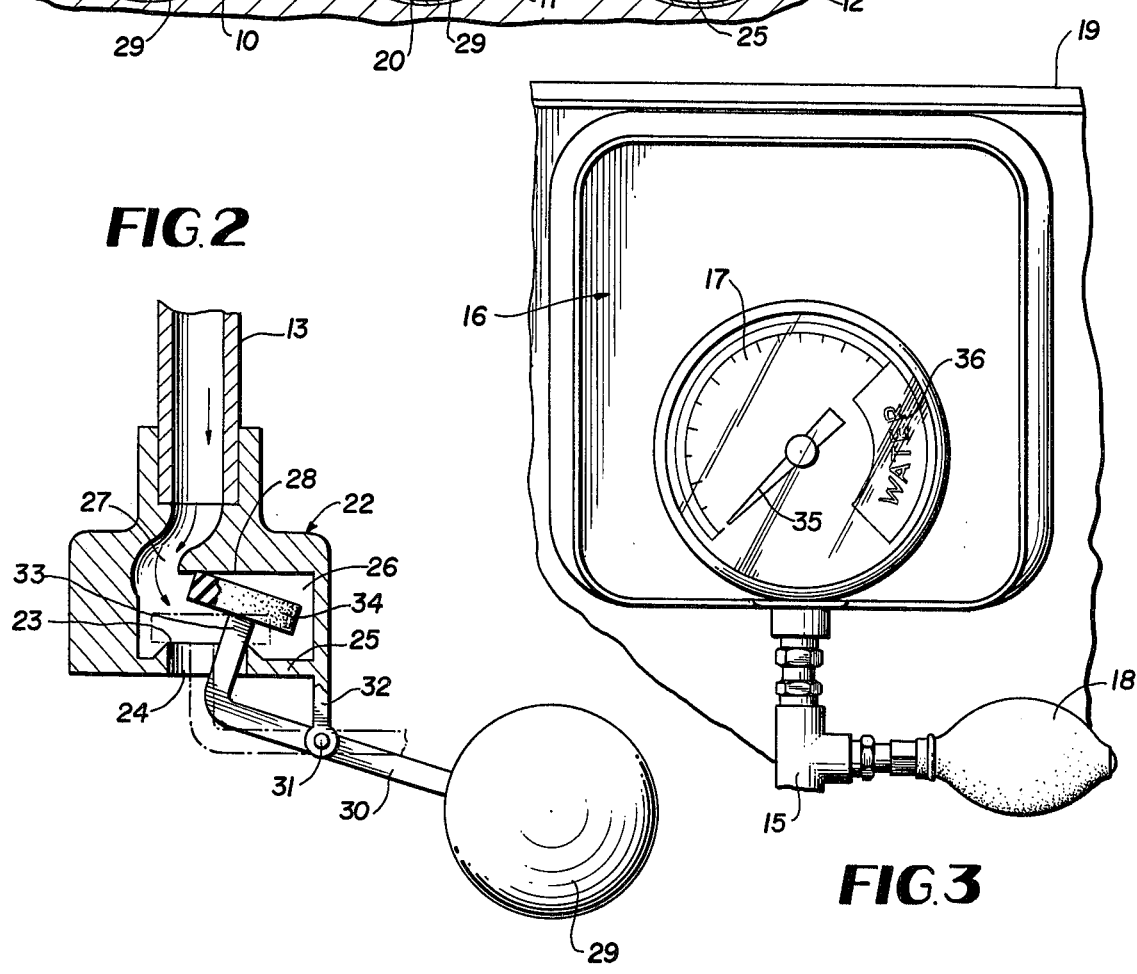
FIG.3

WATER DETECTOR MEANS FOR TANK LIQUID LEVEL MEASURING SYSTEM

CROSS-REFERENCE TO RELATED APPLICATION

This application contains subject matter in common with prior copending application Ser. No. 734,658, filed Oct. 21, 1976, for REMOTE MULTIPLE TANK LIQUID LEVEL MEASURING DEVICE, now U.S. Pat. No. 4,064,752, and constitutes an improvement thereon.

BACKGROUND OF THE INVENTION

In the above prior application, a tank liquid level measuring system is disclosed in which atmospheric air is simultaneously pumped through a submerged purging tube extending to a point near the bottom of a liquid storage tank and into the bellows compression chamber of a gage which is calibrated to indicate the depth of liquid in the tank in inches or other units. The pumping of atmospheric air is continued until the gage needle falters, indicating that the tube within the tank has been purged or evacuated of liquid, and a balanced pressure condition has been established between the head of liquid in the tank and the instrument compression chamber.

The above system, while capable of many uses, is particularly adaptable to monitoring the levels of gasoline in underground storage tanks in filling stations.

One important problem which the system in the prior application cannot deal with is the problem caused by the accumulation of water near the bottom of the tank beneath the lighter gasoline. Water contamination of gasoline in storage tanks is presently costing the oil companies large sums of money each year in consumer lawsuits and automobile repairs.

With this problem in mind, the objective of the present invention is to provide a simplified and reliable means in the nature of an attachment to the above-referenced system to detect the presence of water in gasoline storage tanks and to indicate directly to the filling station operator at an instrument in his office that the fuel containing water is present in the bottom of the tank.

While this is the principal intended use of the invention, it is equally applicable to many other situations where liquids of different specific gravities are present in the storage vessel and it is desired to detect and indicate the presence of the heavier liquid in the bottom of the tank below the lighter liquid.

SUMMARY OF THE INVENTION

A pivoted float valve is attached to the lower end of the submerged purging tube in a liquid storage tank equipped with a liquid level measuring system of which the purging tube is an element, in accordance with said prior application. The float of the pivoted float valve is weighted to remain submerged in the upper layer of liquid of lesser specific gravity, such as gasoline, and to float on the heavier liquid, such as water, which accumulates in the bottom of the tank. When the heavier liquid reaches a level in the tank where the float begins to rise, the float operated valve will automatically close the purging orifice of the purging or sensing tube and will block further evacuation of liquid from the tube by purging air. Further air pressurization of the tube will only tend to seat the float valve more tightly and the remote measuring gage will register a maximum scale reading indicating "water in tank", "water", or another suitable legend.

BRIEF DESCRIPTION OF THE DRAWINGS

FIG. 1 is a partly schematic elevational view of a liquid level measuring system for below-ground storage tanks including means to detect and indicate the presence of water or other heavier liquids in the bottoms of the tanks beneath gasoline or other lighter liquids.

FIG. 2 is an enlarged central vertical cross section taken through a purging tube attached heavy liquid detecting float valve according to the invention.

FIG. 3 is an enlarged fragmentary elevational view of a tank liquid level measuring gage employed in the system including an indicator of the presence of water or other heavier liquid in the tank.

DETAILED DESCRIPTION

Referring to the drawings in detail, wherein like numerals designate like parts, FIG. 1 depicts schematically a tank liquid level measuring system substantially according to the disclosure in the above-referenced prior application and including plural underground storage tanks 10, 11 and 12 for gasoline or the like, each having a vertical purge or sensing tube 13, 13' and 13a coupled therein so that the bottom of the tube terminates near and above the bottom of the particular storage tank. These vertical sensing or purge tubes are connected through associated conduits 14, 14' and 14a with a three-way rotary selector valve, not shown, which selector valve is connected through a T-fitting 15 to the bellows compression chamber of a pressure gage 16 whose measuring dial 17 is calibrated in inches or other suitable linear distance units to indicate depth of liquid in the storage tanks 10, 11 and 12 selectively. Through a simple manual pumping means 18, atmospheric air is pumped simultaneously to the compression chamber of the gage 16 and through the three-way selector valve, not shown, to any selected one of the tubes 13, 13' or 13a to purge the latter of liquid and obtain an indication on the instrument dial 17 of the depth of liquid stored in any one of the tanks. This entire structure and mode of operation thus far described is identical to the disclosure in the referenced prior application and need not be further explained herein for a full understanding of this invention.

As in the prior application, the gage 16, pump means 18 and selector valve are held within a security housing 19 conveniently mounted on a wall in a service station office or the like.

In order to impart to the tank level measuring system the added capability of detecting and indicating remotely the presence of water 20, or other contaminating heavier liquid in the bottom of any tank beneath the main liquid body 21 of gasoline or other lighter liquid, the following simple means is provided.

On the lower end of each sensing or purge tube 13 is sealingly mounted a preferably plastic valve casing 22 having an internal upwardly facing valve seat 23 surrounding a purging orifice 24 at the bottom wall 25 of the casing 22. The main chamber 26 of valve casing 22 communicates with the tube 13 through an offset or loop passage 27. A stop surface 28 or shoulder is provided adjacent to the loop passage 27 in spaced opposing relationship to the valve seat 23.

A preferably stainless steel float ball 29 secured to an arm 30, pivoted between its ends at 31 to a depending extension 32 on valve casing 22 carries an upturned arm extension 33. The arm extension 33 projects through the orifice 24 and has a rubber-like valve disc or seal 34 secured to its upper end within the chamber 26. When the float ball 29 is unsupported, as when submerged in a liquid whose specific gravity is such that the float ball will sink, the valve disc 34 will be elevated, FIG. 2, and unseated and the purging orifice 24 will be open as shown.

When the float ball 29 encounters liquid 20 of higher specific gravity, such as water, whose buoyant force will elevate the float ball, the arm 30 will pivot at 31 and the valve element 34 will move down and engage the seat 23 sealingly and the purging orifice 24 is closed so that no further liquid can be purged from the particular tube 13 by the action of the pump 18. In fact, further air pressurization of the tube 13 by the pump 18 will only tend to close the valve more tightly against the seat 23.

The tank liquid level measuring system operates in exactly the same manner described in the above-referenced application and involves the coordinated activities of the gage 16, pumping means 18, selector valve not shown, and purge tubes 13, 13' and 13a. By virtue of the present invention installed in the system, whenever water 20 or other liquid of sufficient specific gravity reaches a certain level in one of the tanks, the float 29 for that tank will begin to be lifted and eventually the valve element 34 will close and seal the purge port 24. As a consequence, continued air pressurization of the associated tube 13, 13' or 13a by the pump 18 will only seal the valve 34 more tightly and this will prevent evacuation of any further liquid from the bottom of the associated purge tube. The resulting air pressure trapped in the tube will produce on the gage 16 by its indicator needle 35 a maximum reading at the dial face zone 36 indicating that water is present in the particular tank. The advantage of this detection and indication to the service station manager and to the company owning the service station in terms of decreased liability or damage caused by polluted fuel should be completely obvious to those skilled in the art.

The essence of the invention, therefore, resides in the provision of the purging or sensing tube of the tank level measuring arrangement of a valve which is actuated by a float, the float becoming buoyant in a contaminating liquid of one weight and remaining non-buoyant or sinking in another liquid of lesser weight, such as gaoline, contained in the storage tank above the contaminating liquid. The arrangement is highly simplified, very reliable in operation and inexpensive to manufacture. It forms a simple attachment to an existing system or may be incorporated into other systems of a similar nature but for specifically different applications.

It may also be noted in connection with FIG. 2 that when the valve disc 34 is in the raised or open position shown in full lines, fluid flowing downwardly in the tube 13 and through the loop passage 37 cleanly by-passes the disc 34 which is sheltered beneath the shoulder 28 and thus exerts no closing force on the float valve. However, when the valve disc 34 is in the closed position shown in broken lines caused by the presence of water in one of the tanks, the fluid flow from the tube 13 will impinge on top of the disc element 34 and assist in closing or sealing the valve even more securely.

When the water has been removed from the tanks or tank, the weight of the float 29 is sufficient to unseat the valve disc 34 by gravity action. In some instances, it may be desirable to install some pressure relief means in the gage 16 but in most cases this will not be necessary to the proper operation of the system.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In a liquid level measuring system for liquid storage vessels, a liquid level measuring gage, a conduit connected with said gage and projecting into a liquid storage vessel near the bottom thereof, and pumping means common to a compression chamber of the gage and said conduit and operable to evacuate liquid from the conduit by pressure while simultaneously pressurizing the compression chamber of said gage, the improvement comprising a float valve means on the lower end of the conduit near the bottom of the liquid storage vessel and adapted in an open condition to uncover an orifice communicating with the conduit, and in a closed condition to cover said orifice whereby pressure in the conduit developed by said pumping means increases and causes said gage to provide a maximum reading indicating the presence in the bottom of the storage vessel of a contaminating liquid having a specific gravity greater than that of the stored liquid in the vessel above the contaminating liquid, said float valve means having a float element which is adapted to float in the contaminating liquid and which sinks in said stored liquid of lesser specific gravity.

2. In a liquid level measuring system as defined in claim 1, said float valve means comprising a valve casing coupled with the lower end of said conduit and having a chamber, said orifice formed in the bottom wall of said chamber, and said chamber serving to place the bore of the conduit and said orifice in communication, said valve means further including a float activated valve element within said chamber.

3. In a liquid level measuring system as defined in claim 2, and an upwardly facing valve seat around said orifice on said bottom wall within said chamber, said valve element comprising a disc valve element, an arm carrying the disc valve element and pivoted on said casing and projecting through said orifice, and said float element carried by said arm externally of said casing.

4. In a liquid level measuring system as defined in claim 3, and said disc valve element formed of rubber-like material to promote sealing with said valve seat.

5. In a liquid level measuring system as defined in claim 4, and means forming a stop shoulder in said chamber of the valve casing in spaced relation to the valve seat, said stop shoulder arresting movement of said valve element away from said seat.

6. In a liquid level measuring system as defined in claim 3, said arm being L-shaped and including a relatively short lateral extension projecting through said orifice and into said chamber and having the valve disc attached thereto in said chamber, the main body portion of the arm lying exteriorly of the valve casing and pivoted thereto between the ends of the main body portion, and said float element secured to the end of the main body portion away from the disc valve element and on one side of the pivot of the arm.

7. In a liquid level measuring system as defined in claim 6, and said valve casing having an offset flow passage for diverting fluid around the disc valve element when the disc valve element is elevated from its seat and for directing fluid on top of the disc valve element when it is seated.

* * * * *